350-170. SR 10-05-71 XR 3,610,818

[11] 3,610,818

[72] Inventor Horst Bachmann
Darmstadt, Germany
[21] Appl. No. 36,925
[22] Filed May 13, 1970
[45] Patented Oct. 5, 1971
[73] Assignee Fernseh GmbH
Darmstadt, Germany
[32] Priority May 14, 1969
[33] Germany
[31] P 19 24 564.8

[54] COLOR TELEVISION CAMERA WITH A DEVICE FOR ADDITIONAL ILLUMINATION OF SIGNAL CONVERTING PLATES OF CAMERA TUBES
6 Claims, 2 Drawing Figs.

[52] U.S. Cl. 178/5.40, 178/5.4 TC, 350/170, 350/172, 350/173
[51] Int. Cl. H04n
[50] Field of Search 178/5.2, 5.4, 5.40, 5.4 TC; 350/169, 170, 172, 173; 315/11

[56] References Cited
UNITED STATES PATENTS

| | | | |
|---|---|---|---|
| 3,546,371 | 12/1970 | Tan | 178/5.40 |
| 3,515,460 | 6/1970 | Baluteau | 178/5.40 |
| 3,335,284 | 8/1967 | Parks | 315/11 |

*Primary Examiner*—Robert L. Griffin
*Assistant Examiner*—Richard P. Lange
*Attorney*—Ernest F. Marmorek

ABSTRACT: The color spectrum separating optical device for a color television camera comprises a combination of a triangular prism with a quadrangular prism. The triangular prism has an image light input face and two output faces. An output face of the triangular prism mates with a light input face of the quadrangular prism and is coated with a dichroic layer. The opposite light input face of the quadrangular prism is ground at such an angle as to project an auxiliary light beam on the mating faces of the two prisms in the region thereof where the image light beam from the image lens system passes through the two prisms. The light output faces of the prisms are optically coupled to the signal converting plates of the color camera tubes. One of the output faces of the quadrangular prism is also coated with a second dichroic layer.

Inventor:
Horst Bachmann,
by Eugene A. Marcus,
His Attorney.

Inventor:
Horst Bachmann, by [signature],
His Attorney.

COLOR TELEVISION CAMERA WITH A DEVICE FOR ADDITIONAL ILLUMINATION OF SIGNAL CONVERTING PLATES OF CAMERA TUBES

BACKGROUND OF THE INVENTION

The invention relates generally to color television cameras with a plurality of camera tubes and channels. More particularly, this invention relates to an optical device for separating the projected light image into the primary color spectrum to be fed respective signal converting plates of the television camera tubes, and for projecting an additional illumination on these signal converting plates.

The introduction of additional light when using plumbicon-type tubes in color television cameras has been found very useful for suppressing the afterglow and for testing and verifying the electronic and optical setting of the camera.

In prior art optical systems for color television cameras, there has been necessary the so-called relay lens to provide the additional illumination and the testing projection on the signal converting plates of the camera tubes. Without this relay lens, there have arisen difficulties due to the limited operative length. Besides, it would be necessary to arrange reflecting surfaces in front of or within the optical system. In color television cameras with relay lenses and with the light beam splitting mirrors, the focusing can easily be achieved as there is a sufficiently large space in front of the photoelectric signal converting plates where a light source, or illumination, or fluorescent rings, or a mirror for the testing projector can be disposed. The disadvantage of the prior art optical system of this type resides in that additional optical means such as, for example, partially transparent mirrors or small solid mirrors in the region of the path of the rays from the image lens system must be employed.

BRIEF SUMMARY OF THE INVENTION

It is, accordingly, an object of this invention to avoid the disadvantages of the device for additional illumination of the color television cameras.

In particular, it is an object of this invention to provide a novel optical system which, even in color television cameras without relay lenses, permits simple additional illumination of signal converting plates of the television camera tube.

Another object of this invention is to simplify the design of the color television camera.

A further object of this invention is to provide a device for additional illumination of the color television camera without the use of additional semitransparent mirrors or small solid mirrors in the region of passage of the light image.

A still further object of this invention is to provide optical means for controlling the light color and the light intensity of the auxiliary light beam to be projected on the signal converting plates of color television camera tubes.

According to this invention, the above mentioned objects in color television cameras having an image pickup lens system and a plurality of television camera tubes with signal converting plates are attained by providing an optical device for separating the light image from the image pickup lens system into the primary color images by means of a first prism having an input face and two output faces. One output face of the first prism mates with an input face of the second prism and is coated with a first dichroic layer. The second, quadrangular prism has another input face arranged opposite to the first one and two light output faces. One of these output faces that is located opposite to the image pickup lens system is provided with a second dichroic coating and is optically coupled by means of a further prism to one camera tube. The remaining light output faces to the two prisms are also optically coupled with corresponding camera tubes. An auxiliary illumination source is disposed in alignment with the optical axis of the second light input face of the quadrangular prism is such a manner as to project the auxiliary light beam on the dichroic layer between the adjacent faces of the two prisms, thereby splitting the auxiliary light beam and superimposing the same as the separated primary color images. By additional optical means, the auxiliary light beam may be controlled as to the color quality and the light beam intensity. Such a control may be accomplished by means of displaceable color filters, for example.

This particular manner of introducing the additional light enables an improved construction of the entire television camera since the additional light beam passes to the camera tubes directly through the prism system without passing through the dichroic coating. Consequently, it is possible to control in a simple manner the additional light beam in the space between the dichroic coating and the photoelectric signal converting plates of the television camera tubes.

It is also desirable that additional optical means for focusing the testing light beam and the light image on respective signal converting plates be disposed in the optical device of this invention.

BRIEF DESCRIPTION OF SEVERAL VIEWS OF THE DRAWING

For a better understanding of this invention, together with other and further objects thereof, reference is had to the following description taken in connection with the accompanying drawing, in which.

DETAILED DESCRIPTION

Figure 1:
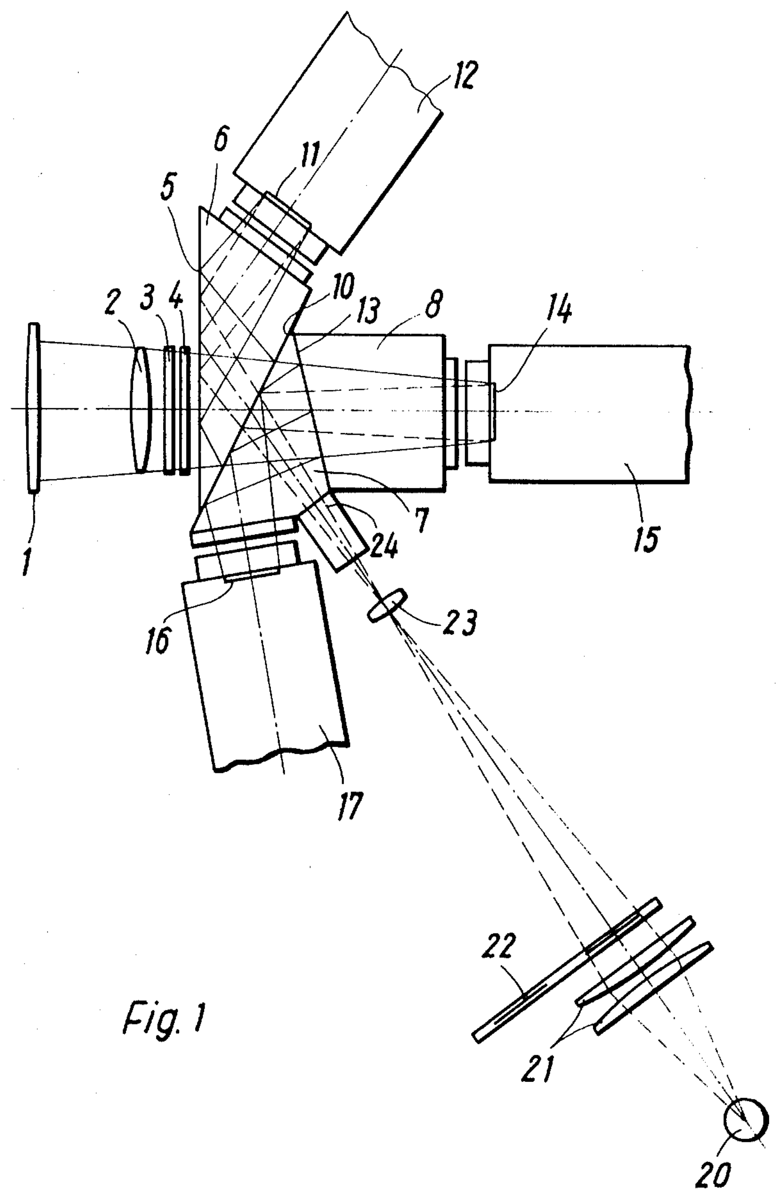
FIG. 1 is a schematic fragmentary side elevational view of the color television camera with the device for additional illumination of the signal converting plates of the camera tubes.

In the drawing, like parts are marked by identical reference numerals. All details not necessary for comprehension of the invention have been omitted to improve the clarity. With reference to FIG. 1, the color television camera contains image lens system with a front lens 1 and a rear lens 2 for passing the light beam of the image of the scene through two filters 3 and 4 and an optical prism system which will be described in greater detail hereafter to the green signal converting plate 11 of the television camera tube 12, to the red signal converting plate 14 of the tube 15, and to the blue signal converting plate of the television camera tube 17. The television camera tubes 12, 15 and 17 are preferably plumbicon-type camera tubes.

The prism system is formed by a combination of a triangular prism 6 with a quadrangular prism 7. The image light beam enters the triangular prism 6 through the input face opposite to the lens and filter systems 1, 2, 3 and 4. The upper output face of the triangular prism 6 is optically coupled with the green image television camera tube 12 whereas the lower color light output face thereof is directly adjacent to the first light input face of the quadrangular prism 7. There results a thin air gap between the mating surfaces of the prisms 6 and 7. One of these mating faces is provided with a first dichroic layer 10 that acts as a color selective coating. The dichroic layer 10 reflects the central green part of the visible spectrum which is reflected at the input face 5 and directed to the green signal converting plate 11 of the television camera tube 12. The long-wave (red) portion of the spectrum passes both through the first dichroic layer 10 and through a second dichroic layer 13 that is disposed on a the color light output face of the quadrangular prism 7, and is directed through a suitable light conducting prism 8 to the red signal converting plate of the tube 15. The dichroic layer 13 reflects the short-wave (blue) portion of the splitted image light beam. This blue light portion is totally reflected from the mating face of the prism 7 and directed to the blue signal converting plate 16 of the camera tube 17.

According to one feature of this invention, a beam of light from an auxiliary light source 20 is introduced into the prism system to illuminate additionally the signal converting plates 11, 14 and 16 of the respective camera tubes. The light beam from the auxiliary light source 20 passes via a condenser lens 21, a displaceable filter 22, and via a lens 23 and a suitable optical coupling member into the auxiliary light input face 24 of the quadrangular prism 7. The face 24 is inclined with respect to the opposite input face with the dichroic layer 10 at such an angle as to direct the perpendicularly impinging auxiliary light beam to the region of the layer 10 that is occupied by the sectional area of the image light beam from the pickup lens system 1 and 2. The auxiliary light beam is split up at the dichroic layer 10 into partial light auxiliary beams that are superimposed to the corresponding color light image beams. The partial color light auxiliary beams thereby illuminate respective signal converting plates of the camera tubes 12, 15 and 17. Such an additional illumination reduces afterglow phenomena.

Figure 2:
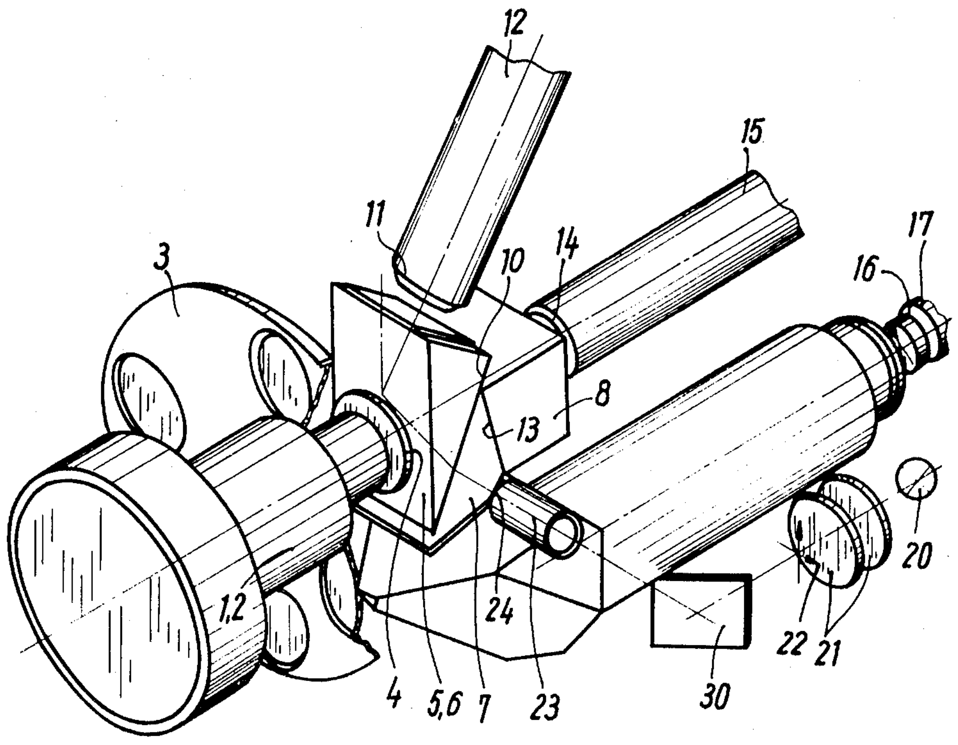
FIG. 2 is a fragmentary perspective view, partly in cutaway section, of the color television camera and device of FIG. 1.

As seen in FIG. 2, the arrangement according to this invention results in a very simple and compact color television camera where separate beam splitting semitransparent and solid mirrors have been avoided. The light beam can very easily be controlled, preferably by displaceable filters 3 and 22. For the sake of compactness, there may be employed an auxiliary light beam deflecting mirror 30 to direct at an angle the light beam from the source 20 to the lens 23. The controllable auxiliary light beam makes it possible that the so-called "black value lifting" caused by the effect of the additional illumination, can be finely adjusted and, even when replacing the camera tubes, the afterglow effect can be reduced to minimum.

It is also possible that the displaceable filter 3 is made in the form of a rotatable filter disc similar to the filter disc 22.

I wish it to be understood that I do not desire to be limited to the exact details of construction shown and described, for obvious modifications will occur to a person skilled in the art.

Having thus described the invention, what I claim as new and desire to be secured by Letters Patent, is as follows:

1. In a color television camera having an image pickup lens system, a plurality of primary color television camera tubes with corresponding signal converting plates, and an optical device for separating an image light beam from said image pickup lens system into primary color images for said camera tubes and for providing an additional illumination of said signal converting plates to suppress the afterglow, said optical device comprising, in combination, a first prism having a light beam input face and two light beam output faces; and a second prism having two light beam input faces and two light beam output faces;

one of said beam output faces of said first prism being provided with a dichroic layer to separate the incoming light beam and mating with a first light beam input face of said second prism;

one output face of said second prism being provided with another dichroic layer to further separate the incoming light beam;

the output faces of said second prism and the free output face of said first prism being optically coupled with the signal converting plates of respective camera tubes;

the second light beam input face of said second prism being disposed opposite to said first light beam input face and directed thereto at such an angle as to project its perpendicular center axis through the mating faces of said prisms at the region of passage of said light beam from said image pickup lens system; and an auxiliary illumination source for transmitting an auxiliary light beam through said second light beam input face of said second prism in the direction of said center axis, whereby the parts of the auxiliary light beam reflected from and passing through said second dichroic layer is traveling in the same direction as the part of the incoming light.

2. In a color television camera according to claim 1, said optical device further comprising means for focusing a test image into the auxiliary light beam for projection on to the signal converting plates of the primary camera tubes.

3. In a color television camera, according to claim 2, said optical device further comprising light beam control means for controlling the light color and the light intensity of the light beams from said image pickup lens system.

4. In a color television camera according to claim 1, said optical device further comprising optical coupling means for focusing said primary color images on respective signal converting plates of said camera tubes.

5. In a color television camera, according to claim 3, said light beam control means being displaceable filters arranged in the path of said image light beam from said image pickup lenses and in the path of said auxiliary light beam.

6. In a color television camera according to claim 1, said optical device comprising means to control the intensity of the auxiliary light beam.